United States Patent
Hanada (10) Patent No.: US 7,911,162 B2
(45) Date of Patent: Mar. 22, 2011

(54) MOTOR DRIVE DEVICE AND CONTROL METHOD

(75) Inventor: Hideto Hanada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 336 days.

(21) Appl. No.: 12/226,103

(22) PCT Filed: May 1, 2007

(86) PCT No.: PCT/JP2007/059796
§ 371 (c)(1),
(2), (4) Date: Oct. 8, 2008

(87) PCT Pub. No.: WO2007/129760
PCT Pub. Date: Nov. 15, 2007

(65) Prior Publication Data
US 2009/0121669 A1    May 14, 2009

(30) Foreign Application Priority Data
May 9, 2006    (JP) .................... 2006-130207

(51) Int. Cl.
H02P 7/00    (2006.01)
H02P 6/08    (2006.01)
H02M 3/22    (2006.01)
(52) U.S. Cl. .................. 318/139; 318/801; 318/805
(58) Field of Classification Search .............. 318/432, 318/434, 760, 727, 800, 801, 805, 811, 599, 318/139, 400.09; 180/65.21, 65.265; 363/95, 363/132; 701/22
See application file for complete search history.

(56) References Cited

U.S. PATENT DOCUMENTS

| | | | |
|---|---|---|---|
| 6,060,859 A * | 5/2000 | Jonokuchi | 318/801 |
| 2004/0165868 A1 | 8/2004 | Sato et al. | |
| 2006/0180365 A1* | 8/2006 | Innami et al. | 180/65.5 |
| 2007/0126385 A1* | 6/2007 | Egami et al. | 318/432 |

(Continued)

FOREIGN PATENT DOCUMENTS

JP    A-2000-358393    12/2000

(Continued)

OTHER PUBLICATIONS

Chinese Office Action issued in Application No. 200780016578.4; dated Sep. 10, 2010 (with translation).

(Continued)

Primary Examiner — Bentsu Ro
Assistant Examiner — Eduardo Colon
(74) Attorney, Agent, or Firm — Oliff & Berridge, PLC (57) ABSTRACT

A motor drive device (100) includes a boost converter (12) boosting a power supply voltage and outputting a boosted voltage; an inverter (14) receiving the boosted voltage from the boost converter (12) and driving a motor (M1); and a controller (30) giving a target value of the boosted voltage to the boost converter (12) and setting one of a rectangular-wave control and a non-rectangular-wave control as a control method of the inverter (14). The controller (30) is capable of selecting from a first operation mode for giving a first boosted target value and designating the non-rectangular-wave control as the control method and a second operation mode for giving a second boosted target value lower than the first boosted target value and designating the rectangular-wave control as the control method, in response to a same predetermined input signal indicating a torque request.

10 Claims, 5 Drawing Sheets

U.S. PATENT DOCUMENTS

| | | | |
|---|---|---|---|
| 2009/0108794 A1* | 4/2009 | Ochiai et al. | 318/760 |
| 2009/0159350 A1* | 6/2009 | Hanada et al. | 180/65.265 |
| 2010/0013421 A1* | 1/2010 | Itoh | 318/400.09 |
| 2010/0176757 A1* | 7/2010 | Yamakawa et al. | 318/400.09 |

FOREIGN PATENT DOCUMENTS

| | | |
|---|---|---|
| JP | A-2004-166415 | 6/2004 |
| JP | A-2005-045880 | 2/2005 |
| JP | A-2005-051894 | 2/2005 |
| JP | A-2005-160183 | 6/2005 |
| KR | 2004-19372 | 3/2004 |
| WO | WO 2005/013473 A1 | 2/2005 |

OTHER PUBLICATIONS

Korean Office Action issued in Application No. 10-2008-7029922; dated Oct. 7, 2010 (with translation).

* cited by examiner

| CONTROL METHOD | A1. SINUSOIDAL WAVE PWM | A2. OVERMODULATION PWM | A3. RECTANGULAR-WAVE (ONE PULSE) |
|---|---|---|---|
| OUTPUT VOLTAGE WAVEFORM OF INVERTER | FUNDAMENTAL WAVE COMPONENT | FUNDAMENTAL WAVE COMPONENT | FUNDAMENTAL WAVE COMPONENT |
| MODULATION RATIO | 0~0.61 | 0.61~0.78 | 0.78 |
| CHARACTERISTIC | SMALL TORQUE VARIATION | ENHANCED OUTPUT IN MIDDLE SPEED REGION | ENHANCED OUTPUT IN HIGH SPEED REGION |

MOTOR DRIVE DEVICE AND CONTROL METHOD

TECHNICAL FIELD

The present invention relates to a motor controller, and particularly to a motor controller for a vehicle.

BACKGROUND ART

In recent years, as an environmentally friendly car, a vehicle using an electric motor, such as an electric car, a hybrid car, and a fuel-cell vehicle, is receiving broad attention.

In such a hybrid car, an electric car, and the like, considerations are made on boosting a direct-current voltage from a power supply with a boost converter and converting the boosted direct-current voltage into an alternating voltage to drive a motor.

Japanese Patent Laying-Open No. 2005-45880 describes switching of a control method of an inverter among a sinusoidal wave pulse-width-modulation (PWM) control, an overmodulation PWM control, and a rectangular-wave control in a hybrid car having such a boost converter.

The rectangular-wave control involves a smaller switching loss and has higher system efficiency than the sinusoidal wave PWM control and the overmodulation PWM control. On the other hand, the rectangular-wave control is susceptible to transient disturbance and therefore following is possible only in a limited range. Consequently, it is necessary to set a region where the rectangular-wave control is carried out (hereinafter referred to as "rectangular-wave control region") with a margin, and therefore there is a limit to enhancement of the system efficiency.

On the other hand, presence or absence of the transient disturbance is greatly affected by a manner of driving by a driver. The rectangular-wave control region may be expanded for some drivers.

DISCLOSURE OF THE INVENTION

It is an object of the present invention to provide a motor controller that can enhance system efficiency.

In summary, the invention is a motor drive device including: a booster boosting a power supply voltage and outputting a boosted voltage; an inverter receiving the boosted voltage from the booster and driving a motor; and a controller giving a target value of the boosted voltage to the booster and setting one of a rectangular-wave control and a non-rectangular-wave control as a control method of the inverter. The controller can select from a first operation mode for giving a first boosted target value and designating the non-rectangular-wave control as the control method and a second operation mode for giving a second boosted target value lower than the first boosted target value and designating the rectangular-wave control as the control method in response to a same predetermined input signal indicating a torque request.

It is preferable that the controller can select from first commanded torque and second commanded torque change of which is moderated as compared with the first commanded torque in response to a same predetermined input signal indicating a torque request, selects the first commanded torque when the controller selects the first operation mode, and selects the second commanded torque when the controller selects the second operation mode.

It is preferable that the motor drive device further includes an input switch providing an instruction as to which of the first and second operation modes should be selected to the controller.

It is preferable that the motor drive device further includes a mode informing unit making an operator recognize which one of the first and second modes is selected.

It is preferable that the controller switches the operation mode from the first operation mode to the second operation mode when a traffic jam is predicted in a course.

According to another aspect of the invention, there is provided a motor drive device including: a booster boosting a power supply voltage and outputting a boosted voltage; an inverter receiving the boosted voltage from the booster and driving a motor; and a controller giving a target value of the boosted voltage to the booster and setting one of a pulse-width-modulation control and a non-pulse-width-modulation control as a control method of the inverter. The controller can select from a first operation mode for giving a first boosted target value and designating the pulse-width-modulation control as the control method and a second operation mode for giving a second boosted target value lower than the first boosted target value and designating the non-pulse-width-modulation control as the control method in response to a same predetermined input signal indicating a torque request.

It is preferable that the controller can select from first commanded torque and second commanded torque change of which is moderated as compared with the first commanded torque in response to a same predetermined input signal indicating a torque request, selects the first commanded torque when the controller selects the first operation mode, and selects the second commanded torque when the controller selects the second operation mode.

It is preferable that the motor drive device further includes an input switch for providing an instruction as to which of the first and second operation modes should be selected to the controller.

It is preferable that the motor drive device further includes a mode informing unit for making an operator recognize which one of the first and second modes is selected.

It is preferable that the controller switches the operation mode from the first operation mode to the second operation mode when a traffic jam is predicted in a course.

According to the invention, it is possible to further improve the system efficiency in the motor control.

BEST MODE FOR CARRYING OUT THE INVENTION

An embodiment of the present invention will be specifically described below with reference to the drawings. The same or corresponding portions in the drawings are provided with the same reference numerals to avoid repeated description of the portions.

Figure 1:
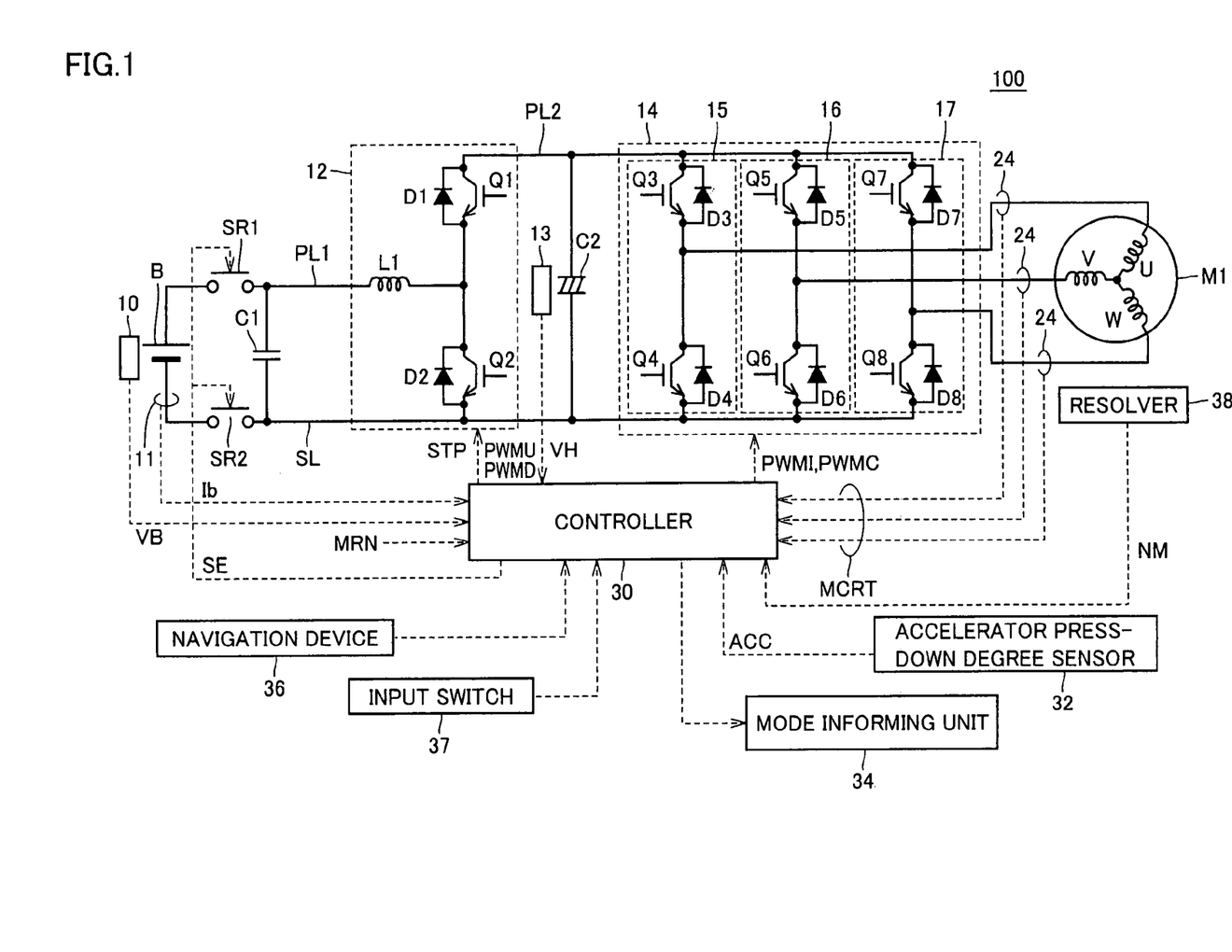
FIG. 1 is a circuit diagram of a motor drive device according to an embodiment of the present invention.

FIG. 1 is a circuit diagram of a motor drive device according to the embodiment of the invention.

With reference to FIG. 1, the motor drive device 100 includes a direct-current power supply B, voltage sensors 10, 13, system relays SR1, SR2, capacitors C1, C2, a boost converter 12, an inverter 14, current sensors 11, 24, and a controller 30.

An alternating-current motor M1 is a drive motor for generating torque for driving drive wheels of a hybrid car or an electric car. Alternatively, the motor may have a function as a motor driven by an engine and may be mounted in the hybrid car as a motor operating for the engine and capable of starting the engine, for example.

Boost converter 12 includes a reactor L1, NPN transistors Q1, Q2, and diodes D1, D2. One end of the reactor L1 is connected to a power supply line PL1 of direct-current power supply B and the other end is connected to an intermediate point between NPN transistor Q1 and NPN transistor Q2, i.e., between an emitter of NPN transistor Q1 and a collector of NPN transistor Q2.

NPN transistors Q1 and Q2 are connected in series between a power supply line PL2 and a ground line SL. A collector of NPN transistor Q1 is connected to power supply line PL2 and an emitter of NPN transistor Q2 is connected to ground line SL. Between the collector and the emitter of each of NPN transistors Q1, Q2, diode D1 or D2 for passing an electric current from the emitter side to the collector side is disposed.

Inverter 14 includes a U-phase arm 15, a V-phase arm 16, and a W-phase arm 17. U-phase arm 15, V-phase arm 16, and W-phase arm 17 are provided in parallel between power supply line PL2 and ground line SL.

U-phase arm 15 includes NPN transistors Q3, Q4 connected in series. V-phase arm 16 includes NPN transistors Q5, Q6 connected in series. W-phase arm 17 includes NPN transistors Q7, Q8 connected in series. Between a collector and an emitter of each of NPN transistors Q3 to Q8, each of diodes D3 to D8 is connected to pass an electric current from the emitter side to the collector side.

Intermediate points of the respective phase arms are connected to respective phase ends of respective phase coils of alternating-current motor M1. In other words, alternating-current motor M1 is a three-phase permanent magnet and is formed of U-phase, V-phase, and W-phase three coils with their one ends commonly connected to a middle point. The other end of the U-phase coil is connected to an intermediate point between NPN transistors Q3, Q4, the other end of V-phase coil is connected to an intermediate point between NPN transistors Q5, Q6, and the other end of W-phase coil is connected to an intermediate point between NPN transistors Q7, Q8, respectively.

In place of NPN transistors Q1 to Q8 and the like, other power switching elements such as IGBTs (insulated gate bipolar transistors) or power MOSFETs may be used.

Direct-current power supply B includes a nickel-hydride or lithium-ion secondary battery. Voltage sensor 10 detects a direct-current voltage VB output from direct-current power supply B and outputs detected direct-current voltage VB to controller 30. Current sensor 11 detects a direct current Ib output from direct-current power supply B and outputs detected direct current Ib to controller 30. System relays SR1, SR2 are turned on or off in response to a signal SE from controller 30.

Capacitor C1 smooths the direct-current voltage supplied from direct-current power supply B and supplies the smoothed direct-current voltage to boost converter 12.

Boost converter 12 boosts the direct-current voltage supplied from capacitor C1 to capacitor C2. To put it more concretely, when boost converter 12 receives a signal PWMU from controller 30, it boosts the direct-current voltage and supplies the direct-current voltage to capacitor C2 according to a time period over which NPN transistor Q2 is ON in response to signal PWMU. In this case, NPN transistor Q1 is OFF in response to signal PWMU. When boost converter 12 receives a signal PWMD from controller 30, it steps down the direct-current voltage supplied from inverter 14 via capacitor C2 to charge direct-current power supply B.

Capacitor C2 smooths the direct-current voltage from boost converter 12 and supplies the smoothed direct-current voltage to inverter 14. Voltage sensor 13 detects voltages at opposite ends of capacitor C2, i.e., an output voltage VH of boost converter 12 (corresponding to an input voltage to inverter 14. Hereinafter the same shall apply) and outputs detected output voltage VH to controller 30.

When the direct-current voltage is supplied from capacitor C2 to inverter 14, inverter 14 converts the direct-current voltage into an alternating voltage to drive alternating-current motor M1 based on a signal PWMI from controller 30. As a result, alternating-current motor M1 is driven to produce torque commanded by a torque command value TR. At a time of a regenerative braking of the hybrid car or the electric car mounted with motor drive device 100, inverter 14 converts the alternating voltage generated by alternating-current motor M1 into a direct-current voltage based on a signal PWMC from controller 30 and supplies the converted direct-current voltage to boost converter 12 via capacitor C2.

The regenerative braking mentioned here includes braking involving regenerative electric power generation when a foot brake is operated by a driver driving the hybrid car or the electric car and deceleration (or stop of acceleration) of the vehicle while carrying out regenerative electric power generation by turning off an accelerator pedal during traveling without operating the foot brake.

Current sensors 24 detect a motor current MCRT passing through alternating-current motor M1 and output detected motor current MCRT to controller 30.

Controller 30 determines torque command value TR based on an accelerator press-down degree Acc obtained from an accelerator press-down degree sensor 32, generates signal PWMU for driving boost converter 12 and signal PWMI for driving inverter 14 based on torque command value TR, a motor rotation number ON, direct-current voltage VB from voltage sensor 10, output voltage VH from voltage sensor 13, and motor current MCRT from current sensors 24, and output generated signal PWMU and signal PWMI to boost converter 12 and inverter 14, respectively.

Signal PWMU is a signal for driving boost converter 12 when boost converter 12 converts the direct-current voltage from capacitor C1 into output voltage VH. When boost converter 12 converts the direct-current voltage into output voltage VH, controller 30 feedback-controls output voltage VH and generates signal PWMU for driving boost converter 12 so that output voltage VH agrees with a target value.

When controller 30 receives a signal indicating that the hybrid car or the electric car has been put into a regenerative braking mode from an external ECU, it generates signal PWMC for converting the alternating voltage generated by alternating-current motor M1 into the direct-current voltage and outputs signal PWMC to inverter 14. In this case, switching of NPN transistors Q3 to Q8 of inverter 14 is controlled by signal PWMC. In this way, inverter 14 converts the alternating voltage generated by alternating-current motor M1 into the direct-current voltage and supplies the direct-current voltage to boost converter 12.

When controller 30 receives from the external ECU a signal indicating that the hybrid car or the electric car has been put into the regenerative braking mode, it generates signal PWMD for stepping down the direct-current voltage supplied from inverter 14 and outputs generated signal PWMD to boost converter 12. In this way, the alternating voltage generated by alternating-current motor M1 is converted into the direct-current voltage, stepped down, and supplied to direct-current power supply B.

Furthermore, controller 30 generates signals SE for turning on or off system relays SR1, SR2 and outputs signals SE to system relays SR1, SR2.

Controller 30 determines an operation mode and controls inverter 14 based on pieces of information from accelerator press-down degree sensor 32, an input switch 37, and a navigation device 36. Controller 30 informs an occupant of the determined operation mode by using a mode informing unit 34.

Figure 2:
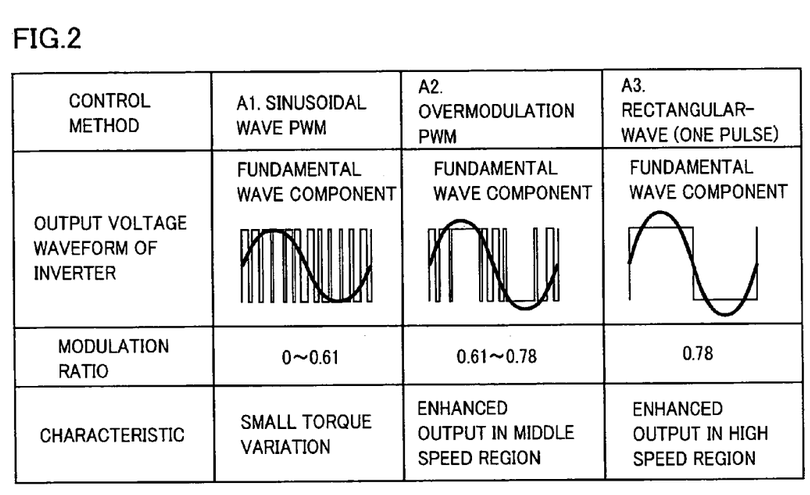
FIG. 2 is a diagram showing control methods for controlling an inverter 14 by a controller 30 in FIG. 1.

FIG. 2 is a diagram showing control methods for controlling inverter 14 by controller 30 in FIG. 1.

In a motor driving system for controlling driving of the alternating-current motor by converting the direct-current voltage into the alternating voltage by the inverter as shown in FIG. 1, in general, a motor current is often controlled according to a sinusoidal wave PWM (pulse-width-modulation) control based on a vector control in order to drive the alternating-current motor with high efficiency.

However, in the sinusoidal wave PWM control method, a fundamental wave component of the output voltage of the inverter cannot be enhanced sufficiently and there is a limit to a voltage utilization factor. Therefore, it is difficult to obtain a high output in a region of high rotation speed. In view of this point, employment of modulation method that can output a voltage with a higher fundamental wave component than the sinusoidal wave PWM control method has been proposed.

For example, there is proposed a control configuration (hereinafter also referred to as "rectangular-wave control method") for applying a rectangular-wave voltage to an alternating-current motor to enhance an output in a high rotation region and driving the alternating-current motor for rotation, in which a torque control of the alternating-current motor is performed by controlling phase of the rectangular-wave voltage based on a deviation of a torque command value and actual torque from each other.

There is also proposed employment of "an overmodulation PWM control method" for utilizing an intermediate voltage waveform between the rectangular-wave control method and the sinusoidal wave PWM control method. In motor drive device 100, switch is properly made among three control methods, i.e., the sinusoidal wave PWM control, the overmodulation PWM control, and the rectangular-wave control according to motor operation conditions (represented by torque and the rotation speed).

As shown in FIG. 2, the sinusoidal wave PWM control method is one used as a general PWM control and controls ON/OFF of the switching elements of the respective phase arms according to comparison between voltages of a sinusoidal wave voltage command value and a carrier (represented by a triangular wave). As a result, duty ratio is controlled so that a group of fundamental wave components in a high-level period corresponding to an ON period of the upper arm element and a low-level period corresponding to an ON period of the lower arm element become sinusoidal waves in a certain time period. As is well known, by the sinusoidal wave PWM control method, an effective value of the fundamental wave component (modulation ratio) can be only enhanced up to 0.61 times an inverter direct-current input voltage.

On the other hand, in the rectangular-wave control method, one pulse of rectangular-wave including the high-level period and the low-level period at a ratio of one to one is applied to the alternating motor in the above-described certain time period. As a result, the modulation ratio can be enhanced up to 0.78.

The overmodulation PWM control method carries out a PWM control similar to the above-described sinusoidal wave PWM control method after distorting the carrier to reduce amplitude. As a result, the fundamental wave component can be distorted and the modulation ratio can be enhanced up to a range of 0.61 to 0.78.

In alternating-current motor M1, if the rotation number or the output torque increases, an induced voltage becomes high and required voltage of the motor becomes high. The boosted voltage by boost converter 12, i.e., system voltage VH need be set to be higher than the motor required voltage (induced voltage). On the other hand, there is a limit value (VH maximum voltage) of the boosted voltage by boost converter 12, i.e., system voltage VH.

In other words, in a region where the motor required voltage (induced voltage) is lower than the maximum value of system voltage VH (VH maximum voltage), a maximum torque control according to the sinusoidal wave PWM control method or the overmodulation PWM control method is applied and the output torque is controlled to be the torque command value by the motor current control according to the vector control.

On the other hand, if the motor required voltage (induced voltage) reaches the maximum value of system voltage VH (VH maximum voltage), the rectangular-wave control method according to a field weakening control is applied after maintaining system voltage VH. In the rectangular-wave control method, because the amplitude of the fundamental wave component is fixed, the torque control is performed by the voltage phase control of the rectangular-wave pulses based on the deviation of the actual torque value and the torque command value from each other and obtained by the electric power arithmetic.

Figure 3:
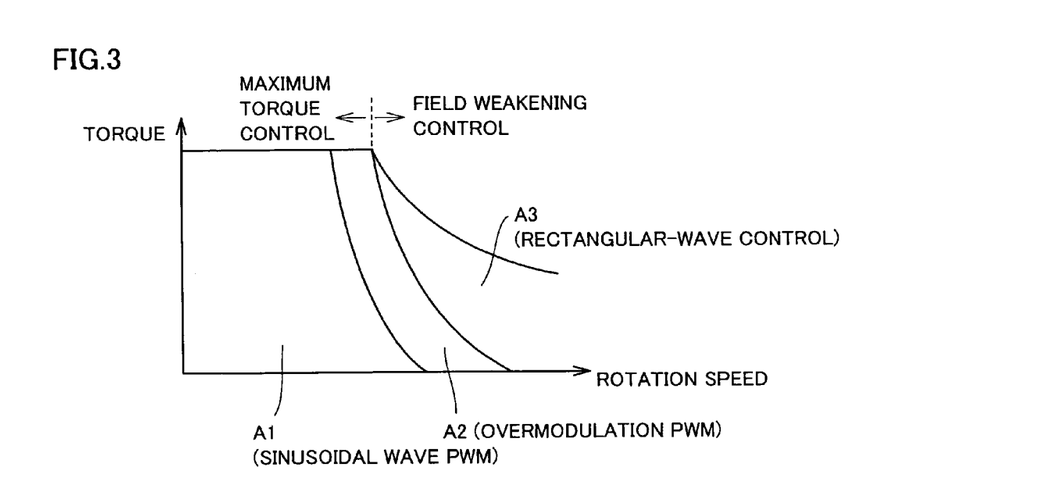
FIG. 3 is a diagram showing how to determine the control method at a certain boosted voltage.

FIG. 3 is a diagram showing how to determine the control method at a certain boosted voltage.

As shown in FIG. 3, the sinusoidal wave PWM control method is used in order to reduce torque variation in a low rotation speed region A1, the overmodulation PWM control method is applied in a middle rotation speed region A2, and the rectangular-wave control method is applied in a high rotation speed region A3. Especially, by applying the overmodulation PWM control method and the rectangular-wave control method, enhancement of the output of alternating-current motor M1 in the middle rotation and high rotation speed regions can be achieved. As described above, which one of the control methods shown in FIG. 2 is used is determined in a range of realizable modulation ratio.

Figure 4:
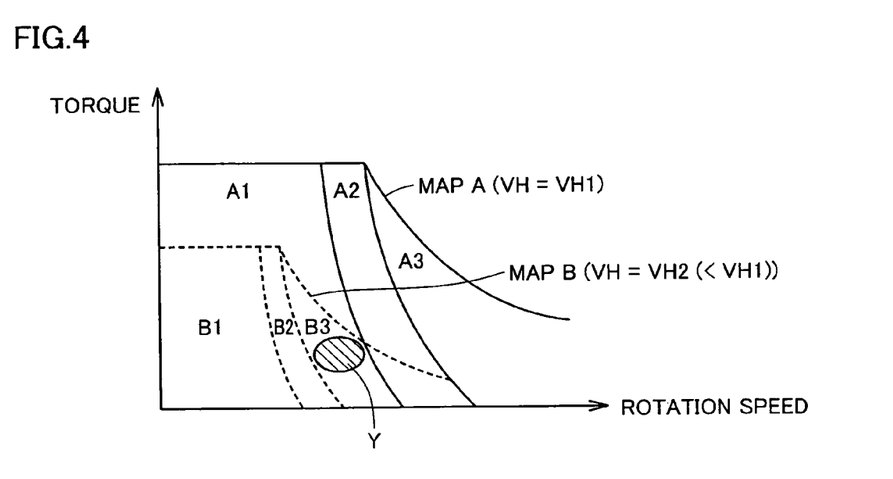
FIG. 4 is a diagram for explaining a relationship between a boosted voltage by a boost converter and the control methods in FIG. 3.

FIG. 4 is a diagram for explaining a relationship between a boosted voltage by the boost converter and the control methods in FIG. 3.

With reference to FIGS. 1 and 4, if voltage VH that is the output voltage of boost converter 12 is VH1, as shown in a map A in solid lines in FIG. 4, the sinusoidal wave PWM control method is used in low rotation speed region A1, the overmodulation PWM control method is used in middle rotation speed region A2, and the rectangular-wave control method is used in high rotation speed region A3.

On the other hand, if voltage VH is VH2 lower than VH1, as shown in a map B in broken lines in FIG. 4, the sinusoidal wave PWM control method is used in a low rotation speed region B1, the overmodulation PWM control method is used in a middle rotation speed region B2, and the rectangular-wave control method is used in a high rotation speed region B3.

Such maps are determined for each voltage VH and stored in advance in a memory incorporated in controller 30.

In other words, even in regions with the same rotation speed and the same torque, different control methods are applied to the respective regions depending on the set boosted voltage of boost converter 12. For example, a region Y often used for measuring 10-15 mode fuel efficiency belongs to region A1 and the sinusoidal PWM control method is applied when voltage VH=VH1 while region Y belongs to region B3 and the rectangular-wave control method is applied when voltage VH=VH2.

To focus on the fuel efficiency, voltage VH is set to VH2. In this way, boost converter 12 does not carry out much boosting. Region Y belongs to region B3 in map B and the rectangular-wave control method is applied. If battery voltage VB suffices as the voltage, the switching loss becomes zero. In switching of inverter 14, the rectangular-wave control method involves lower switching loss than the sinusoidal wave PWM control method, because switching of power elements is less frequent in the rectangular-wave control method. Therefore, losses are reduced in both boost converter 12 and inverter 14 and therefore the fuel efficiency of the vehicle is improved. This case is susceptible to disturbance and therefore it is preferable to restrict sudden change in the requested torque. For example, by moderating the change in the requested torque with respect to change in the accelerator press-down degree, it is possible to restrict the sudden change in the requested torque.

On the other hand, in cases of repeating abrupt acceleration or traveling on a road with many curves or an uneven road, some drivers focus more on responsivity of the vehicle than the fuel efficiency. In this case, voltage VH is set to VH1. In this way, boost converter 12 carries out extra boosting, region Y belongs to region A1 in map A, and inverter 14 is controlled by the sinusoidal wave PWM control method that provides high responsivity.

Figure 5:
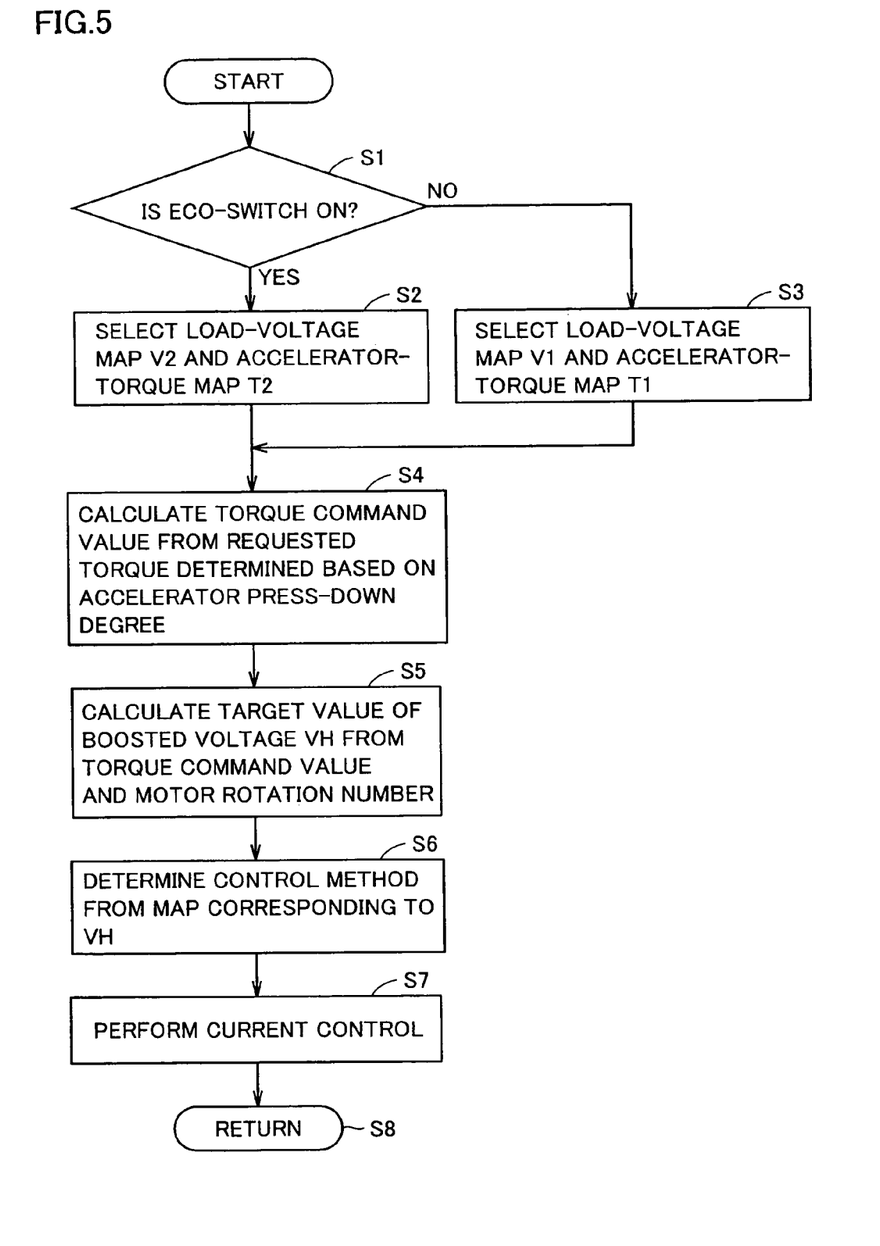
FIG. 5 is a flow chart showing a control configuration of a program executed by controller 30 in FIG. 1 for determining the boosted voltage and the control method.

FIG. 5 is a flow chart showing a control configuration of a program executed by controller 30 in FIG. 1 for determining the boosted voltage and the control method. Processing in this flow chart is invoked and performed every time a certain time elapses or a predetermined condition is satisfied.

With reference to FIGS. 1 and 5, controller 30 first detects how input switch 37 is set in step S1. Here, input switch 37 in FIG. 1 is referred to as an eco-switch for setting an operation mode to a fuel efficiency-focused mode, for example.

An instruction on which to select from a normal mode and an eco-mode is provided from the eco-switch to controller 30. If setting of the eco-switch is an ON state, the processing goes to step S2. If the setting of the eco-switch is an OFF state, the processing goes to step S3.

Figure 6:
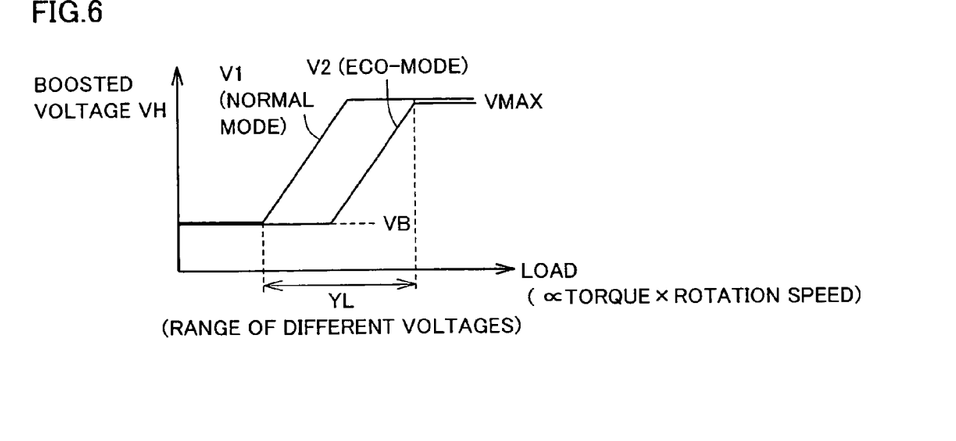
FIG. 6 is a diagram showing maps for determining the boosted voltage with respect to a load.

FIG. 6 is a diagram showing maps for determining the boosted voltage with respect to a load. The load on a horizontal axis is proportional to the product of the torque and the rotation speed if the rotation is constant, for example.

Figure 7:
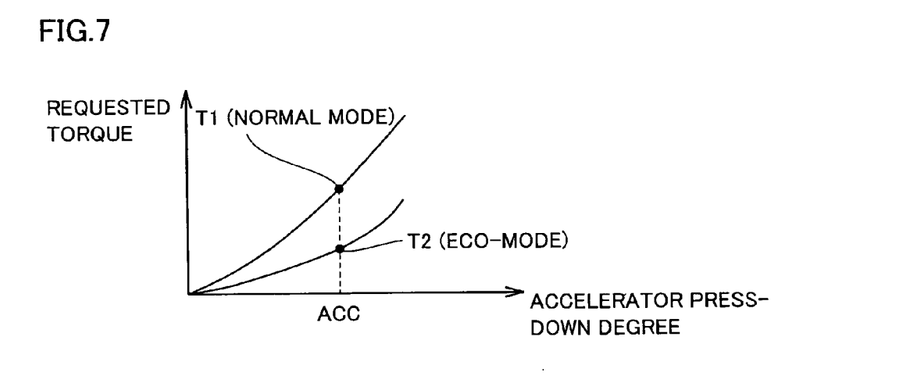
FIG. 7 is a diagram showing maps for determining requested torque with respect to an accelerator press-down degree.

FIG. 7 is a diagram showing maps for determining the requested torque with respect to the accelerator press-down degree.

In step S2 in FIG. 5, a boosted voltage target value is determined based on a voltage V2 in FIG. 6 and the requested torque is determined based on requested torque T2 in FIG. 7. On the other hand, in step S3, the boosted voltage target value is determined based on a voltage V1 in FIG. 6 and the requested torque is determined based on requested torque T1 in FIG. 7.

When map selection in step S2 or step S3 finishes, the processing goes to step S4. In step S4, the torque command value is calculated from the requested torque determined based on the accelerator press-down degree. In other words, as shown in FIG. 7, controller 30 can select from requested torque T1 and requested torque T2 change of which is moderated in response to the same predetermine input signal Acc indicating a torque request and given by accelerator press-down degree sensor 32. If the driver selects the normal mode by using input switch 37, requested torque T1 is selected. If the driver selects the eco-mode, requested torque T2 is selected.

As a method of moderating the change, there are some methods other than this method of switching between the maps.

Figure 8:
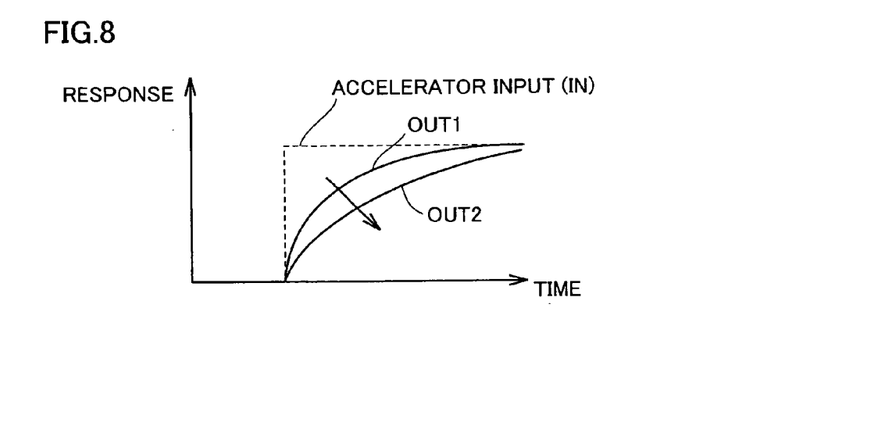
FIG. 8 is a waveform diagram for explaining another example for moderating change of the requested torque.

FIG. 8 is a waveform diagram for explaining another example for moderating change of the requested torque.

With reference to FIG. 8, an input signal IN given by the accelerator press-down degree sensor is used as the requested torque after it is filtered, for example. By switching a coefficient of the filter between the normal mode and the eco-mode, a signal OUT1 is used as the requested torque in the normal mode and a signal OUT2 the change of which is moderated as compared with signal OUT1 is used as the requested torque in the eco-mode.

With reference to FIG. 5 again, description of the processing in step S5 and steps after that performed following step S4 will be continued.

In step S5, controller 30 determines the target value of boosted voltage VH by using the maps in FIG. 6 from the torque command value calculated in step S4 and the motor rotation number detected by a resolver 38. Then, the processing in step S6 is performed following step S5.

In step S6, which one of the sinusoidal wave PWM control, the overmodulation PWM control, and the rectangular-wave control is used as the control method is determined from the maps determined for respective boosted voltages VH shown in FIG. 4.

In summary, processing performed in steps S5 and S6 is as follows. Specifically, motor drive device 100 includes boost converter 12 boosting the power supply voltage and outputting the boosted voltage, inverter 14 receiving the boosted voltage from boost converter 12 and driving motor M1, and controller 30 giving the target value of the boosted voltage to boost converter 12 and setting one of the rectangular-wave control and the non-rectangular-wave control as the control method of inverter 14. According to another aspect, the switching of the control method may be expressed as setting one of a pulse-width-modulation control and a non-pulse-width-modulation control.

In such a structure, if a state of the vehicle is in region Y described in FIG. 4, the load in FIG. 6 is in a range of YL. Therefore, controller 30 can select from a first operation mode (normal mode) for giving a first boosted target value V1 and designating the non-rectangular-wave control as the control method and a second operation mode (eco-mode) for giving a second boosted target value V2 lower than the first boosted target value V1 and designating the rectangular-wave control as the control method in response to a same predetermined input signal indicating a torque request. The driver can change the operation mode according to his/her liking by using input switch 37.

If the control method is determined in step S6, transistors Q3 to Q8 of inverter 14 are switched in step S7 according to the control method to perform the current control of the motor. In step S8, the control shifts to a main routine.

It is preferable that processing for making an operator recognize which one of the normal mode and the eco-mode is selected is performed by using mode informing unit 34 before step S4.

Controller 30 selects from the operation mode (hereinafter referred to as the normal mode) focusing on ride quality and responsivity and the operation mode (hereinafter referred to as the eco-mode) focusing on the fuel efficiency according to setting of input switch 37. Controller 30 informs the driver of which one of the normal mode and the eco-mode is currently selected as the operation mode by using mode informing unit 34.

For example, as mode informing unit 34, a light that illuminates when the eco-mode is selected may be provided or a meter panel having a background color changing according to the operation mode may be provided. In a case of a vehicle having an air cleaner, the air cleaner may emit a smell that gives an idea of forest bathing when the eco-mode is selected to thereby inform the driver that the eco-mode is selected.

By informing the driver of the selection of the eco-mode in a proactive manner, it is possible to prevent a sense of excessive discomfort in the driver aroused by a change in feeling of operation of the vehicle due to the selection of the eco-mode.

Moreover, it is preferable that controller 30 switches the operation mode from the normal mode to the eco-mode to use the map in step S2 in place of the map in step S3 when a traffic jam is predicted in a course based on information from navigation device 36 before the shift from step S1 to S3. For example, traffic jam information provided from a traffic information providing service such as VICS (vehicle information and communication system) may be taken into navigation device 36 and the operation mode may be switched to the eco-mode at an expected time of arrival at a congested area if a traffic jam is detected in a course from a present location to a set destination.

In this way, even if the driver designates the normal mode, the fuel efficiency can be improved in a situation that does not require high vehicle performance.

Although the operation mode providing high performance of the vehicle is referred to as the normal mode while the mode providing improved fuel efficiency is referred to as the eco-mode in the embodiment, it is not the only way. For example, the invention of the present application may be applied while referring the mode where providing the improved fuel efficiency as the normal mode and referring the operation mode providing the high performance of the vehicle as a power mode.

The embodiment disclosed this time is an example in all points and should not be considered restrictive. The scope of the invention is not defined in the above description of the embodiment but is defined in claims and includes meanings equivalent to the claims and all modifications in the scope of claims.

The invention claimed is:

1. A motor drive device comprising:
    a booster boosting a power supply voltage and outputting a boosted voltage;
    an inverter receiving the boosted voltage from said booster and driving a motor; and
    a controller giving a target value of the boosted voltage to said booster and setting one of a rectangular-wave control and a non-rectangular-wave control as a control method of said inverter, wherein
    said controller is capable of selecting from a first operation mode for giving a first boosted target value and designating said non-rectangular-wave control as said control method and a second operation mode for giving a second boosted target value lower than said first boosted target value and designating said rectangular-wave control as said control method, in response to a same predetermined input signal indicating a torque request.

2. The motor drive device according to claim 1, wherein said controller is capable of selecting from first commanded torque and second commanded torque change of which is moderated as compared with said first commanded torque in response to said predetermined input signal, selects said first commanded torque when said controller selects said first operation mode, and selects said second commanded torque when said controller selects said second operation mode.

3. The motor drive device according to claim 1, further comprising an input switch providing an instruction as to which of said first and second operation modes should be selected to said controller.

4. The motor drive device according to claim 1, further comprising a mode informing unit making an operator recognize which one of said first and second modes is selected.

5. The motor drive device according to claim 1, wherein said controller switches said operation mode from said first operation mode to said second operation mode when a traffic jam is predicted in a course.

6. A motor drive device comprising:
    a booster boosting a power supply voltage and outputting a boosted voltage;
    an inverter receiving the boosted voltage from said booster and driving a motor; and
    a controller giving a target value of the boosted voltage to said booster and setting one of a pulse-width-modulation control and a non-pulse-width-modulation control as a control method of said inverter, wherein
    said controller is capable of selecting from a first operation mode for giving a first boosted target value and designating said pulse-width-modulation control as said control method and a second operation mode for giving a second boosted target value lower than said first boosted target value and designating said non-pulse-width-modulation control as said control method, in response to a same predetermined input signal indicating a torque request.

7. The motor drive device according to claim 6, wherein said controller is capable of selecting from first commanded torque and second commanded torque change of which is moderated as compared with said first commanded torque in response to said predetermined input signal, selects said first commanded torque when said controller selects said first operation mode, and selects said second commanded torque when said controller selects said second operation mode.

8. The motor drive device according to claim 6, further comprising an input switch providing an instruction as to which of said first and second operation modes should be selected to said controller.

9. The motor drive device according to claim 6, further comprising a mode informing unit for making an operator recognize which one of said first and second modes is selected.

10. The motor drive device according to claim 6, wherein said controller switches said operation mode from said first operation mode to said second operation mode when a traffic jam is predicted in a course.

* * * * *